US007863355B2

(12) United States Patent
Futterer et al.

(10) Patent No.: US 7,863,355 B2
(45) Date of Patent: *Jan. 4, 2011

(54) MOULDING MATERIAL FOR THE PRODUCTION OF FIRE-RETARDING OBJECTS, PIGMENT THEREFOR AND USE THEREOF

(75) Inventors: Thomas Futterer, Ingelheim (DE); Hans-Dieter Naegerl, Dudenhofen (DE); Vincens Mans Fibla, Badalona (ES); Ruediger Wissemborski, Gau-Algesheim (DE)

(73) Assignee: Chemische Fabrik Budenheim KG, Budenheim (DE)

( * ) Notice: Subject to any disclaimer, the term of this patent is extended or adjusted under 35 U.S.C. 154(b) by 512 days.

This patent is subject to a terminal disclaimer.

(21) Appl. No.: 11/665,200

(22) PCT Filed: Oct. 14, 2005

(86) PCT No.: PCT/EP2005/055282

§ 371 (c)(1),
(2), (4) Date: Jan. 10, 2008

(87) PCT Pub. No.: WO2006/042830

PCT Pub. Date: Apr. 27, 2006

(65) Prior Publication Data

US 2008/0255278 A1  Oct. 16, 2008

(30) Foreign Application Priority Data

Oct. 15, 2004 (DE) .................. 10 2004 050 479

(51) Int. Cl.
C08K 5/21    (2006.01)
C08K 5/31    (2006.01)
C08K 5/053   (2006.01)
C08K 5/3492  (2006.01)
C08K 5/5313  (2006.01)

(52) U.S. Cl. .................. 524/100; 524/133; 524/186; 524/211; 524/284; 524/387; 524/403; 524/406; 524/407; 524/408; 524/409; 524/413; 524/414; 524/435

(58) Field of Classification Search .......... 524/100, 524/133, 186, 284, 403, 406, 407, 408, 413, 524/414, 435, 211, 387

See application file for complete search history.

(56) References Cited

U.S. PATENT DOCUMENTS

| | | | |
|---|---|---|---|
| 5,063,137 A | 11/1991 | Kiyonari et al. | 430/292 |
| 5,489,639 A | 2/1996 | Faber et al. | 524/417 |
| 5,717,018 A | 2/1998 | Magerstedt et al. | 524/413 |
| 6,482,879 B2 | 11/2002 | Hieltjes et al. | 524/398 |
| 6,706,785 B1 | 3/2004 | Fu | 524/398 |
| 7,115,677 B2 * | 10/2006 | Harashina et al. | 523/205 |

FOREIGN PATENT DOCUMENTS

| | | |
|---|---|---|
| DE | 3917294 | 11/1990 |
| DE | 19531490 | 2/1997 |
| DE | 19707297 | 8/1998 |
| DE | 19905358 | 8/2000 |
| DE | 10053639 | 5/2002 |
| DE | 10145093 | 4/2003 |
| DE | 10255155 | 6/2004 |
| DE | 69531576 | 6/2004 |
| EP | 105451 | 4/1984 |
| EP | 190997 | 1/1986 |
| EP | 330869 | 2/1989 |
| EP | 542115 | 11/1992 |
| EP | 706897 | 10/1995 |
| EP | 764683 | 9/1996 |
| EP | 1196488 | 8/2004 |
| FR | 2568238 | 7/1984 |
| WO | WO98/58805 | 12/1998 |
| WO | WO99/55773 | 11/1999 |
| WO | WO00/02869 | 1/2000 |

* cited by examiner

Primary Examiner—Kriellion A Sanders
(74) Attorney, Agent, or Firm—Michael L. Dunn

(57) ABSTRACT

A moulding material for the production of highly flame resistant articles with a matrix of a thermoplastic and a particulate pigment dispersed therein is characterized in that the pigment is light-sensitive and changes colour under the influence of laser light and in that the pigment is a reaction product of at least one halogen-free flame retardant organic nitrogen base with (i) at least one mixed salt with at least two different cations and/or with
(ii) a mixture of salt type compounds which on heating can be transformed into at least one salt type compound with at least two different cations, as in (i);

wherein in variations (i) and (ii), at least one of the cations is selected from a group (A) of elements Ti, Cr, Mn, Fe, Co, Ni, Cu, Zn, Y, Zr, Nb, Mo, Ag, Sn, Sb, La, Pr, Ta, W and Ce and at least one further cation is selected from a group (B) of elements from periods 3 and 6 of groups II and III, periods 5 and 6 of group IV and periods 4 and 5 of groups III to VIII and the lanthanides of the periodic table of the elements.

15 Claims, No Drawings

MOULDING MATERIAL FOR THE PRODUCTION OF FIRE-RETARDING OBJECTS, PIGMENT THEREFOR AND USE THEREOF

BACKGROUND OF THE INVENTION

Adding flame retardant material in the form of fine particles to plastics and dispersing those fine particles through the whole plastic article or in its surface regions is known. As an example, German patent specification DE-A-101 45 093 describes polyphosphates of organic nitrogen bases such as guanidine and melamine or melamine derivatives as a flame protection agent (retardant) in plastics and as a flame proofing agent in textiles. International patent WO-A-00/02869 describes polyphosphate salts, in particular in glass fibre-reinforced polyamides and polyesters, as flame protection agents. Other organic nitrogen bases are proposed in many other publications as flame protection agents, the tendency in this branch of the industry being to use halogen-free flame protection agents such as aluminium hydroxide, magnesium hydroxide or melamine cyanurate for that purpose.

When such flame protection agents are distributed in halogen-free thermoplastic plastics, a disadvantageous effect may occur which changes the properties of the plastic in an undesirable manner.

In many fields of application, it is desirable to make plastic articles which are flame-proof and capable of being written or marked upon using laser light. There is a practical problem, however, as halogen-free flame-proof flame protection agents do not exhibit sufficient contrast, and so they turn out to be of no practical use.

BRIEF DESCRIPTION OF THE INVENTION

The aim of the invention is to provide plastic moulding materials which can ensure that plastic articles can be made laser-writable without deleteriously affecting the properties of the plastic. The moulding material of the invention for the production of highly flame resistant articles with a matrix formed from a thermoplastic and with a particulate pigment dispersed therein is characterized in that the pigment is light-sensitive and changes colour under the influence of laser light, and in that the pigment is a reaction product of at least one halogen-free flame retardant organic nitrogen base with (i) at least one mixed salt with at least two different cations and/or with (ii) a mixture of salt type compounds which on heating can be transformed into at least one salt type compound with at least two different cations, as in (i), wherein in variations (i) and (ii), at least one of the cations is selected from a group (A) of elements Ti, Cr, Mn, Fe, Co, Ni, Cu, Zn, Y, Zr, Nb, Mo, Ag, Sn, Sb, La, Pr, Ta, W and Ce and at least one further cation is selected from a group (B) of elements from periods 3 to 6 of main groups II and III, periods 5 and 6 of main group IV and periods 4 and 5 of subgroups III to VIII and the lanthanides of the periodic table of the elements.

DETAILED DESCRIPTION OF THE INVENTION

Any known plastic may be used as the matrix material, which is described, for example, in Ullmann's Encyclopedia of Chemistry (volume 15, page 457) and which has already been used for laser marking. Examples of suitable plastics are polyethylene, polypropylene, polyamide, polyester, polyphenylene oxide, polyacetal, polybutylene terephthalate, polymethacrylate, polyoxymethylene, polyvinylacetal, polystyrene, acrylic-butadiene-styrene (ABS), acrylonitrile-styrene-acrylic ester (ASA), polycarbonate, polyether sulphone, polyethylether ketone, polyvinylchloride and thermoplastic polyurethane.

In the context of the present description, polyacetals are polymers which essentially contain oxymethylene groups ($CH_2$—O). They thus encompass polyoxymethylene homopolymers, copolymers, terpolymers and block copolymers.

In the context of the present description, polyesters are thermoplastic polymers with repeating ester groups in the main chain. Examples are polycondensation products of naphthalene dicarboxylic acid, terephthalic acid, isophthalic acid, adipic acid, azelaic acid, sebacinic acid, dodecane dioic acid, cyclohexane dicarboxylic acid, mixtures of these carboxylic acids and ester-forming derivatives with diols such as ethylene glycol, 1,3-propanediol, 1,4-butanediol, 1,4-butenediol or 1,6-hexanediol, 1,4-hexanediol, 1,4-cyclohexanediol, 1,4-di-(hydroxymethyl)-cyclohexane, bisphenol A, neopentylglycol, oligo- or poly-ethylene glycols, oligo- or poly-propylene glycols, oligo- or poly-(tetramethylene) glycols, mixtures of said diols and ester-forming derivatives thereof as well as with other possible co monomers.

Particularly preferred matrix components are polyethylene terephthalate, polybutylene terephthalate and polyether-ester block copolymers.

In the context of the present description, polyamides are thermoplastic polymers with repeated acid amide groups in the main chain. They encompass both homopolymers of the amino acid type and diamine-dicarboxylic acid type as well as copolymers with other possible AA-, BB- and AB-co-monomers. The polyamides which may be used are known and, for example, are described in the Encyclopedia of Polymer Science and Engineering, 11$^{th}$ Edition, pages 315 to 489, John Wiley & Sons, Inc, 1988.

Examples of polyamides are polyhexamethyleneadipinic acid amide, polyhexamethylene azelaic acid amide, polyhexamethylene sebacinic acid amide, polyhexamethylene dodecane dioic acid amide, poly-11-aminoundecane acid amide and bis-(p-amino-cyclohexyl)-methanedodecane acid amide or products obtained by ring opening of lactams, for example polycaprolactam or polylaurinlactam. Further, polyamides based on terephthalic or isophthalic acid as the acid components and/or trimethylhexamethylene diamine or bis-(p-aminocyclohexyl)-propane as the diamine component, as well as polyamide resins produced by copolymerization of two or more of the above polymers or their components, are suitable. An example is a copolycondensate of terephthalic acid, isophthalic acid, hexamethylenediamine and caprolactam.

In the context of this description, polyarylenesulphides are thermoplastic polymers with repeating sulphur groups in the substantially aromatic main chain. They include homopolymers and copolymers.

In the context of this description, the thermoplastic polymers used as blending partners can be any other partially crystalline, liquid crystalline and amorphous polymers. In the context of this description, light-sensitive compounds are organic or inorganic salt type compounds with the combinations as defined above of different cations or mixtures of salt type compounds with the combinations as defined above of different cations, which change colour under the influence of a laser light source.

Plastic polyurethane (PUT) is particularly suitable because its mechanical properties are good and it can be processed cheaply. Thermoplastic polyurethanes are well known from many publications in the literature and from patents.

In variations described in (i) and (ii), the pigment, which is finely dispersed in the thermoplastic matrix material, consists of a mixed salt with at least two different cations or as yet non-transformed precursors which, on heating, for example by melting the pigments, produce the mixed salt of category (i) with at least two different cations.

Highly surprisingly, the metal components, whether as a mixed salt or as a precursor, produce an improvement in contrast as regards laser-writability or markability and simultaneously produce an improvement in flame protection.

The inventive effects described above are obtained by dint of the pigment which on the one hand has flame retardant properties and on the other hand produces laser-writability by absorption of laser light. This pigment is a reaction product of at least one halogen-free flame retardant organic nitrogen base with one of the components in accordance with (i) and (ii). The organic nitrogen base is advantageously melamine or a melamine derivative such as melamine cyanurate, melamine orthophosphate, di-melamine orthophosphate, melamine pyrophosphate, melamine polyphosphate, melamine borate, a melamine salt of a phosphorus acid partial ester, salts of phosphoroxy compounds, ammonium polyphosphate, boron phosphate and combinations thereof. The flame protection agents used can also be used in triazine polymers, melem, melam, urea, guanidine etc.

The term "salt type compound or salt" as used in the present invention means compounds which at least partially dissociate in water into cations and anions or consist of an acid residue and a base residue.

The term "colour change" can mean a transfer from one tone to another, such as from yellow to red or from transparent to black. In the context of the invention, this term also means a change in brightness, for example from light brown to dark brown or to a discoloration of the plastic.

The term "particulate" means that the pigment is in the form of fine solid particles with quantitative parameters being given as the mean particle size ($d_{50}$) and the particle size of the primary particles. The size of the primary particles is in the nanometer to micrometer range. Suitable primary particles have a mean particle size ($d_{50}$) of less than 10 μm, preferably less than 5 μm.

Within the scope of the invention, the pigments can also contain further cations, in particular those from elements from periods 2 to 5 in group I. It is also possible to add to the pigments additional inorganic oxides and/or further colour-producing additives and/or additives which modify the usual properties, such as UV stabilizers, stabilizers against efflorescence, thermal and thermo-oxidative attacks, to improve hydrolytic and azidolytic resistance, lubricants, unmoulding aids, crystallization controlling substances and nucleation agents, fillers, softeners and other additives.

The colour difference obtained with the pigments of the invention can be observed as a locally different light intensity under different light sources, as a locally different colour value, for example in the CIE Lab system or as a locally different colour value in the RGB system.

Normally, the elements are selected so that they have as strong an absorption as possible in the wavelength range of the laser light which is available.

The wavelength ranges of the laser light employed do not constitute a limitation. Suitable lasers generally have a wavelength in the range 157 nm to 10.6 mm, preferably in the range 532 nm to 10.6 mm Examples are $CO_2$ lasers (10.6 mm) and Nd:YAG lasers (1064 nm) or pulsed UV lasers.

Typical excimer lasers have the following wavelengths: $F_2$ excimer laser (157 nm), ArF excimer laser (193 nm), XeCl excimer laser (308 nm), XeF excimer laser (351 nm), frequency multiplied Nd:YAG laser with wavelengths of 532 nm (frequency doubled), 355 nm (frequency trebled) or 265 nm (frequency quadrupled). Particularly preferably, Nd:YAG lasers (1064 or 532 nm) and $CO_2$ lasers are used. The energy densities of the lasers employed in the present invention are generally in the range from 0.3 mJ/cm$^2$ to 50 J/cm$^2$, preferably 0.3 mJ/cm$^2$ to 10 J/cm$^2$. When using pulsed lasers, the pulse frequency is generally in the range 1 to 30 kHz. In the context of this description, the term "light-sensitive compounds" means organic or inorganic salt type compounds with the hereinbefore described combinations of different cations or mixtures of salt type compounds with the hereinbefore described combinations of different cations which change colour under the influence of a laser light source at the illuminated areas.

These compounds can be conventional salts with a definite stoichiometry of one or more anions with a plurality, preferably two cations derived from different elements, but they can also be non stoichiometric compounds which exhibit at least two cations derived from different elements.

Any anion can be used, as long as it is possible to produce compounds with cations from at least two different elements. Preferably, the anions contain at least two different elements.

Particularly preferred components have, as the anions, oxoanions from the periodic system with the exception of phosphinates and diphosphinates and/or their polymers, also anions of organic carboxylic acids as well as carbonic acids, provided that mixed compounds with a plurality of cations can be formed therewith.

Preferred combinations are those in which the non-illuminated compound absorbs in the region of the light wavelength employed.

More preferred combinations are those in which the base colour of the non-illuminated compound can be adjusted by varying the mole ratios of the cations.

In one implementation of the invention, the non-illuminated components have any base colour and the illuminated components have a clearly different colour. In the CIE Lab system, this means there is a high value for dE*, where:

$$dE^* = 2\sqrt{(L^*_1 - L^*_2)^2 + (a^*_1 - a^*_2)^2 + (b^*_1 - b^*_2)^2}$$

index 1 represents the non-illuminated moulding material and index 2 represents the illuminated moulding material.

The CIE L*a*b* (Lab) system is a colour space established by the International Illumination Commission (Commission Internationale d'Eclairage) 1976, in which L*=lightness, a*=red-green colour information and b*=yellow-blue information.

In a preferred embodiment of the invention, the non-illuminated compound has the highest possible lightness (thus as high a lightness value L* as possible in the CIE Lab colour space) and as little as possible a self colour (i.e. as small as possible a deviation from the black-white axis: smallest possible a*, smallest possible b*). In this case, the illuminated compound should have as low a lightness as possible (lightness value L* as low as possible) and as little self colour as possible (smallest possible a*, smallest possible b*).

In a further preferred embodiment of the invention, the non-illuminated component has as high a lightness as possible (lightness value L* as high as possible in the CIE Lab colour space) and as little self colour as possible (as small as possible a deviation from the black-white axis; smallest possible a*, smallest possible b*). In this case, the illuminated component should have as clear a self colour as possible (highest possible a* and/or b*).

In a preferred embodiment of the composition of the invention, the anions of the above components have general formula $A_aO_o(OH)_y{}^{z-}$, where A=tri- or penta-valent phosphorus, tetra-valent molybdenum or hexa-valent tungsten;

a, o and z independently represent whole numbers with values from 1-20; and y is a whole number with values from 0-10.

In a further preferred embodiment of the composition of the invention, the pigment has at least one combination of two different elements of the group consisting of copper, tin, antimony and iron.

In a particularly preferred embodiment of the composition of the invention, the pigment contains anions of phosphorus (V) and/or phosphorus (III) acid, their condensation products or if appropriate with further hydroxide ions, and Cu and Fe or Cu and Sn or Cu and Sb or Sn and Fe as the cations.

Preferably, metallic salts are used which have a particularly high thermal stability so that no degradation occurs when doped into the polymer to produce the combination product. Salts or ligands with a thermal stability of over 200° C. (2% weight loss), preferably with a stability of over 250° C. (2% weight loss) and more particularly with a stability of over 300° C. (2% weight loss) are used.

Light sensitive flame protection combinations are obtained by doping, reacting and mixing the organic nitrogen bases with the metallic compounds of components (i) or (ii). The term "doping" means both the production of mixtures of one or more of said solid ingredients in the powdered state as well as mixing one or more of said solid ingredients in a dissolved or suspended state with subsequent drying of the powdered product.

The products of the invention have flame retardant and laser-writable properties.

The invention also concerns pigments for the manufacture of simultaneously flame retardant and laser-writable plastic articles with the features defined above for the moulding material. The invention also concerns the use of pigments with the features given above for the manufacture of similarly flame retardant and laser-writable plastic articles, in particular from thermoplastic.

EXAMPLE 1

Pigment for a moulding material of the invention was produced as follows: Copper hydroxide (0.1 mole) and isocyanuric acid (0.1 mole) were placed in a mixer with water and mixed by agitation. Thus, a neutralization reaction took place to form a salt. Next, tin phosphate $Sn_3(PO_4)_2$ (1 mole) was added. After 30 min, melamine (10 mole) and cyanuric acid (10 mole) were added in an exact ratio of 1:1. The whole mixture was stirred for 1 h and then vacuum dried at 110° C.

A moulding material of the invention was obtained with the pigment obtained by using the following ingredients. Its flame resistance and laser-writability were determined.

The laser was a commercially available Nd-YAG laser (wavelength 1064 nm). The contrast values were determined using a digital camera mounted on a microscope and image evaluation software. The flame resistance was determined using a UL Box in accordance with UL94. The CTI values were determined in accordance with standard DIN IEC 60112/VDE 0303 Part 1, RAL 7035

| | |
|---|---|
| Polyamide 6,6/6 (mole ratio 1:1) | 88 wt % |
| Melamine cyanurate (produced as above) | 12 wt % |
| UL94 | V0 |
| Contrast (K value) | 4.2 |
| CTI | 520 |

The thermoplastic moulding materials obtained were distinguished by both their superb flame resistance (self extinguishing) and by their high contrast values (K value) on laser-writing.

EXAMPLE 2

Pigment for a moulding material (i) of the invention was produced as follows: A 50 l reactor with a stirrer was filled with 29.25 l of pure water. Orthophosphoric acid (74.75 mole) was added at ambient temperature with stirring. Because the reaction was exothermic, the temperature of the reactor contents rose and was maintained at 50° C. for 10 minutes. Next, melamine (74.75 mole) was added slowly with stirring, avoiding clumping. After a homogeneous suspension had been obtained, a mixture of copper hydroxide (0.74 mole) and iron-II-phosphite (0.29 mole $Fe_3PO_3$) was added to the suspension. The whole mixture was stirred for 1 h at 100° C. then the temperature was raised and it was vacuum dried.

The melamine orthophosphate obtained was transformed into melamine polyphosphate in a furnace at 340° C. The product was then ground to a fineness of 5 microns.

| | |
|---|---|
| Polybutyl terephthalate | 76 wt % |
| Melamine cyanurate | 9 wt % |
| Melamine polyphosphate (produced as above) | 15 wt % |
| UL94 | V0 |
| Contrast (K value) | 4.3 |
| CTI | 530 V |

This moulding material also had superb flame resistance and laser-writability (K value).

What is claimed is:

1. A moulding material for the production of highly flame resistant articles with a matrix formed from a thermoplastic matrix with a particulate pigment dispersed therein wherein the pigment is light-sensitive and changes colour under the influence of laser light and wherein the pigment is a reaction product of at least one halogen-free flame retardant organic nitrogen base with at least one of (i) and (ii) where
    (i) is at least one mixed salt with at least two different cations, and
    (ii) is a mixture of salt type compounds which on heating can be transformed into at least one salt type compound with at least two different cations, as in (i);
    wherein in variations (i) and (ii), at least one of the cations is selected from a group (A) of elements Ti, Cr, Mn, Fe, Co, Ni, Cu, Zn, Y, Zr, Nb, Mo, Ag, Sn, Sb, La, Pr, Ta, W and Ce and at least one further cation is selected from a group (B) of elements from periods 3 to 6 of main groups II and III, periods 5 and 6 of main group IV and periods 4 and 5 of subgroups III to VIII and the lanthanides of the periodic table of the elements.

2. A moulding material according to claim 1 wherein its pigment has a mean particle size ($d_{50}$) of less than 10 μm.

3. A moulding material according to claim 1 wherein its pigment has a mean particle size ($d_{50}$) of less than 5 μm.

4. A moulding material according to claim 1 wherein in addition to the cations from group (A) and (B), it contains further cations from elements in periods 2 to 5 of main group I.

5. A moulding material according to claim 1 wherein its pigment contains, as the anions, salt type compounds with oxoanions from the periodic system with the exception of phosphinates and diphosphinates and/or those polymers, anions of organic carboxylic acids or anions of carbonic acid.

6. A moulding material according to claim 1, wherein its pigment contains, as the anions, phosphorus-containing oxoanions, in particular cyanurate-, phosphate-, condensed phosphate-, phosphonate-, phosphite- and mixed hydroxide-phosphate-oxoanions.

7. A moulding material according to claim 1 wherein the anions of the pigment have the general formula $A_aO_o(OH)_y^{z-}$, wherein A represents penta-valent phosphorus, tetra-valent molybdenum or hexa-valent tungsten, a, o and z independently represent whole numbers in the range 1 to 20 and y represents a whole number between 0 and 10.

8. A moulding material according to claim 1 wherein the cations of its pigment consists of copper, tin, antimony, iron and/or boron.

9. A moulding material according to claim 1 wherein the anions of the salt type compounds consist of phosphorus (V) acid and/or phosphorus (III) acid or condensation products thereof, if appropriate with further hydroxyl ions, and the cations consist of Cu and Fe or Cu and Sn or Cu and Sb or Sn and Fe.

10. A moulding material according to claim 1 wherein the compounds of groups (A) and (B) are so combined together that a combination of these compounds absorbs at a desired wavelength.

11. A moulding material according to claim 1 wherein it contains, as an additive, at least one sterically hindered phenol together with a phosphorus compound.

12. A moulding material according to claim 1 wherein its thermoplastic matrix comprises glass fibre-reinforced polypropylene, polyethylene, polyamide, polybutylene terephthalate, polyethylene terephthalate, polyester, polyester, polyphenylene oxide, polyacetal, polymethacrylate, polyoxymethylene, polyvinylacetal, polystyrene, acrylic-butadiene-styrene (ABS), acrylonitrile-styrene-acrylic ester (ASA), polycarbonate, polyether sulphone, polyether ketone, polyvinylchloride, thermoplastic polyurethane and/or copolymers thereof and/or mixtures thereof.

13. A moulding material according to claim 1 wherein the halogen-free organic nitrogen base consists of melamine, melamine cyanurate, melamine orthophosphate, dimelamine orthophosphate, melamine pyrophosphate, melamine polyphosphate, melamine borate, a melamine salt of a phosphorus acid ester, further salts of III- and V-valent phosphoroxy compounds, ammonium polyphosphate, boron phosphate and mixtures thereof as well as mixtures thereof with synergistic agents such as pentaerythritol, dipentaerythritol, THEIC, triacin polymers, urea, guanidine, melem or melam.

14. A method for the production of highly flame resistant and laser-writable plastic articles by incorporating a pigment in accordance with claim 1.

15. A particulate pigment that is light-sensitive and changes colour under the influence of laser light wherein the pigment is a reaction product of at least one halogen-free flame retardant organic nitrogen base with at least one of (i) and (ii) where
   (i) is at least one mixed salt with at least two different cations, and
   (ii) is a mixture of salt type compounds which on heating can be transformed into at least one salt type compound with at least two different cations, as in (i);
   wherein in variations (i) and (ii), at least one of the cations is selected from a group (A) of elements Ti, Cr, Mn, Fe, Co, Ni, Cu, Zn, Y, Zr, Nb, Mo, Ag, Sn, Sb, La, Pr, Ta, W and Ce and at least one further cation is selected from a group (B) of elements from periods 3 to 6 of main groups II and III, periods 5 and 6 of main group IV and periods 4 and 5 of subgroups III to VIII and the lanthanides of the periodic table of the elements.

* * * * *